(No Model.)
C. N. WHITE.
WASHING MACHINE.
No. 271,385. Patented Jan. 30, 1883.
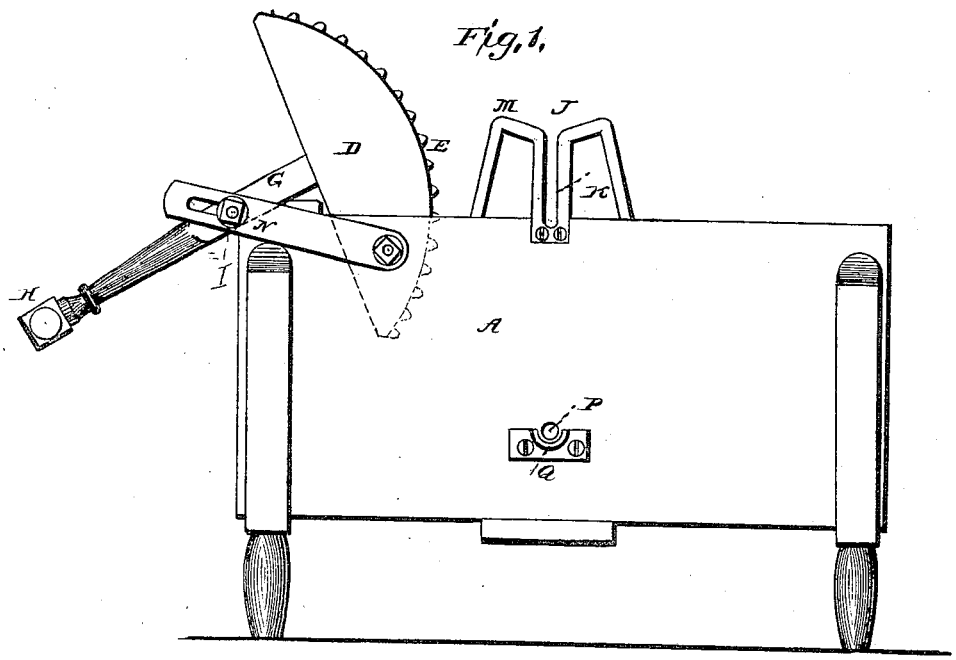
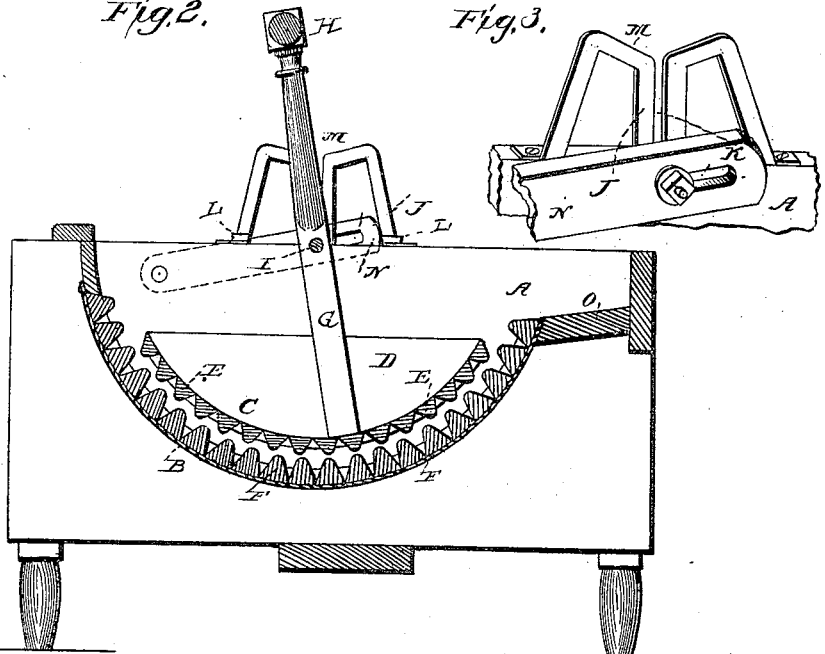
WITNESSES:
Fred. G. Dieterich.
Jno. W. Stockett.
INVENTOR.
Charles N. White,
by Louis Bagger & Co
ATTORNEYS.

UNITED STATES PATENT OFFICE.

CHARLES N. WHITE, OF COLBY'S STATION, MICHIGAN.

WASHING-MACHINE.

SPECIFICATION forming part of Letters Patent No. 271,385, dated January 30, 1883.

Application filed November 29, 1882. (No model.)

*To all whom it may concern:*

Be it known that I, CHARLES N. WHITE, of Colby's Station, in the county of Montcalm and State of Michigan, have invented certain new and useful Improvements in Washing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved washing-machine with the rubber tilted out of the suds-box. Fig. 2 is a longitudinal vertical section of the same, and Fig. 3 is a detail view.

Similar letters of reference indicate corresponding parts in all the figures.

My invention has relation to reciprocating-rubber washing-machines; and it consists in the improved construction and combination of parts of the same, as hereinafter more fully described and claimed.

In the accompanying drawings, the letter A represents the suds-box, the bottom B of which is concave to conform to the curve of the rubber, and may be made of wood or sheet metal, as desired. The rubber C is convex, and has two solid sides, D D, and a bottom composed of ribs E, triangular in cross-section. The ribs F of the bottom are likewise triangular in section, both sets of ribs made of hard wood, and having their ends rounded or beveled to prevent tearing of the clothes. This is the manner in which I prefer to construct the bottom and rubber of the machine; but they may be made of corrugated sheet metal or otherwise without interfering with the spirit of my invention.

The rubber is provided with two slanting uprights, G, which are tenoned in a cross-piece, H, which serves as handle. Through these uprights passes a metal rod, I, some distance above the sides of the rubber, the ends of which rest in bearings J on the sides of the suds-box. These bearings, as shown in detail in Fig. 3, have a vertical slot, K, in the middle, in which the ends of rod I bear, and are fastened upon the upper edge of the sides of the suds-box by screws or other means, and the bent lower ends of the plates forming the bearings are re-enforced by blocks L in the angle where the plates are bent. The upper edges, M, of the bearings are slanting toward the slot K, allowing the ends of the rod I to slide down to the slot when they are placed upon the bearings. The rod I is hinged by its outer end to two arms, N N, one on each side of the suds-box, which again are pivoted at their other ends to the sides of the suds-box, and the ends of these arms where the ends of rod I rest are slotted, so as to allow the rod, with the rubber, to be lifted higher in the slot or let down, according to the quantity of clothes in the suds-box.

When it is desired to remove the rubber from the suds-box it is drawn up out of the slot K and turned over, resting in the slotted ends of arms N, as shown in Fig. 1.

The slotted bearings J have the advantage over the usual way of slotting the sides by not weakening the sides as the slots do, and by allowing the suds-box to be filled to its highest without flowing out through the slots.

In one end of the suds-box is an inclined board, O, to allow the water from the wringer, which may be fastened on that end, to return to the suds-box. A hole, P, in the lower part of the suds-box, provided with a spout, Q, and a removable plug, allows the water to be drawn off after the machine is used.

Having thus described my invention, I claim and desire to secure by Letters Patent of the United States—

1. In a reciprocating-rubber washing-machine, the metallic skeleton bearings J, fastened to the sides of the suds-box and cut out or bent to form slots K, upper edges, M, inclined toward the slot, and bent lower ends re-enforced by blocks L, as shown and set forth.

2. In a reciprocating-rubber washing-machine, the combination of the suds-box A, the metallic skeleton bearings J, fastened upon the edges of the suds-box by their bent ends, re-enforced by blocks L, and having slots K and upper edges, M, inclined toward the slots, the arms N, pivoted upon the sides of the suds-box and having slotted ends, and the rubber D, having arms G and rod I, inserted through the arms and the slotted ends of arms N, adapted to be tilted out of or into bearings J, substantially as and for the purpose shown and set forth.

3. The reciprocating-rubber washing-machine consisting of the suds-box A, having concave ribbed bottom B, inclined board O, and tap-hole P, convex rubber C, having ribbed bottom E, slanting arms or uprights G, tenoned in the handle H, and rock-shaft I, fastened through the arms G, bearings J, having re-enforcing-blocks L, slots K, and inclined upper edges, M, and slotted arms N, pivoted on the sides of the suds-box, all constructed and combined to operate substantially as and for the purpose set forth.

In testimony that I claim the foregoing as my own I have hereunto affixed my signature in presence of two witnesses.

CHARLES N. WHITE.

Witnesses:
C. ELLIS ELLIOT,
D. L. McBURNY.